(12) United States Patent
Bhat et al.

(10) Patent No.: US 7,243,369 B2
(45) Date of Patent: Jul. 10, 2007

(54) UNIFORM RESOURCE LOCATOR ACCESS MANAGEMENT AND CONTROL SYSTEM AND METHOD

(75) Inventors: Shivaram Bhat, Sunnyvale, CA (US); James F. Nelson, Danville, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 831 days.

(21) Appl. No.: 10/127,898

(22) Filed: Apr. 22, 2002

(65) Prior Publication Data

US 2003/0200442 A1 Oct. 23, 2003
US 2006/0095779 A9 May 4, 2006

Related U.S. Application Data

(60) Provisional application No. 60/310,519, filed on Aug. 6, 2001.

(51) Int. Cl.
*G06F 7/00* (2006.01)
*G06F 21/22* (2006.01)

(52) U.S. Cl. ................ 726/6; 726/1; 726/2; 726/8; 713/182; 713/185

(58) Field of Classification Search ........ 709/217–225, 709/229; 713/182, 185, 200, 201, 156, 168; 705/59, 77, 1, 55; 726/1–10, 26–28; 707/9–10
See application file for complete search history.

(56) References Cited

U.S. PATENT DOCUMENTS 5,434,974 A 7/1995 Loucks et al.
5,544,322 A 8/1996 Cheng et al.
5,634,122 A 5/1997 Loucks et al.
5,802,062 A 9/1998 Gehani et al.

(Continued)

FOREIGN PATENT DOCUMENTS

EP 1009130 A1 6/2000

(Continued)

OTHER PUBLICATIONS

European Search Report dated Sep. 5, 2005.

(Continued)

*Primary Examiner*—Hosuk Song
*Assistant Examiner*—Yin-Chen Shaw
(74) *Attorney, Agent, or Firm*—Osha Liang LLP

(57) ABSTRACT

In an enterprise server environment having a uniform resource locator (URL) access management and control system. The server includes a user authentication logic to authenticate users attempting to connect to the server to access URL file and directories residing in the server. In one embodiment of the present invention, the user is provided with an identification token and a user URL access policy which allows the user's credentials to be validated and permitted access to a list of URLs in the directory server. In one embodiment of the present invention, a URL access enforcement logic uses the user's URL access policy to determine which URLs in the directory server a user may or may not access. The user's URL access policy may include an access deny or an access allow value which respectively denies or allows the user access to particular URL.

18 Claims, 6 Drawing Sheets

U.S. PATENT DOCUMENTS

| | | | |
|---|---|---|---|
| 5,850,511 A | 12/1998 | Stoecker et al. | |
| 6,026,440 A | 2/2000 | Shrader et al. | |
| 6,092,196 A * | 7/2000 | Reiche | 726/6 |
| 6,182,142 B1 | 1/2001 | Win et al. | |
| 6,226,666 B1 | 5/2001 | Chang et al. | |
| 6,233,618 B1 * | 5/2001 | Shannon | 709/229 |
| 6,243,816 B1 | 6/2001 | Fang et al. | |
| 6,263,432 B1 | 7/2001 | Sasmazel et al. | |
| 6,317,838 B1 | 11/2001 | Baize | |
| 6,362,836 B1 | 3/2002 | Shaw et al. | |
| 6,453,353 B1 | 9/2002 | Win et al. | |
| 6,513,158 B1 | 1/2003 | Yogaratnam | |
| 6,539,430 B1 * | 3/2003 | Humes | 709/225 |
| 6,587,867 B1 | 7/2003 | Miller et al. | |
| 6,668,322 B1 | 12/2003 | Wood et al. | |
| 6,687,229 B1 | 2/2004 | Kataria et al. | |
| 6,799,208 B1 | 9/2004 | Sankaranarayan et al. | |
| 6,920,494 B2 | 7/2005 | Heitman et al. | |
| 6,957,261 B2 | 10/2005 | Lortz | |
| 7,028,181 B1 * | 4/2006 | McCullough et al. | 713/156 |
| 7,092,370 B2 * | 8/2006 | Jiang et al. | 370/329 |
| 2001/0007133 A1 * | 7/2001 | Moriconi et al. | 713/201 |
| 2001/0037469 A1 | 11/2001 | Gupta et al. | |
| 2001/0044894 A1 * | 11/2001 | Saito et al. | 713/156 |
| 2002/0010768 A1 * | 1/2002 | Marks et al. | 709/223 |
| 2002/0010785 A1 * | 1/2002 | Katsukawa et al. | 709/229 |
| 2002/0046268 A1 * | 4/2002 | Leong et al. | 709/223 |
| 2002/0133723 A1 | 9/2002 | Tait | |
| 2002/0138763 A1 * | 9/2002 | Delany et al. | 713/201 |
| 2002/0169907 A1 | 11/2002 | Candea et al. | |
| 2002/0184507 A1 | 12/2002 | Makower et al. | |
| 2002/0184535 A1 | 12/2002 | Moaven et al. | |
| 2002/0186238 A1 | 12/2002 | Sylor et al. | |
| 2002/0188513 A1 | 12/2002 | Gil et al. | |
| 2003/0018786 A1 | 1/2003 | Lortz | |
| 2003/0074248 A1 * | 4/2003 | Braud et al. | 705/9 |
| 2003/0074580 A1 * | 4/2003 | Knouse et al. | 713/201 |
| 2003/0079147 A1 * | 4/2003 | Hsieh et al. | 713/201 |
| 2003/0088648 A1 * | 5/2003 | Bellaton et al. | 709/219 |
| 2003/0088786 A1 | 5/2003 | Moran et al. | |
| 2003/0093509 A1 | 5/2003 | Li et al. | |
| 2003/0115322 A1 | 6/2003 | Moriconi et al. | |
| 2003/0204619 A1 | 10/2003 | Bays | |
| 2004/0054791 A1 | 3/2004 | Chakraborty et al. | |
| 2004/0103170 A1 | 5/2004 | Borzilleri et al. | |
| 2004/0128615 A1 | 7/2004 | Carmel et al. | |
| 2004/0165007 A1 | 8/2004 | Shafron | |
| 2004/0213258 A1 | 10/2004 | Ramamoorthy | |
| 2004/0267749 A1 | 12/2004 | Bhat et al. | |
| 2005/0021818 A1 | 1/2005 | Singhal et al. | |
| 2005/0021978 A1 | 1/2005 | Bhat et al. | |
| 2005/0117576 A1 | 6/2005 | McDysan et al. | |

FOREIGN PATENT DOCUMENTS

| | | |
|---|---|---|
| EP | 1-089-516 A | 4/2001 |
| WO | WO-01/11452 A | 2/2001 |

OTHER PUBLICATIONS

Samar V: "*Single Sign-On Using Cookies for Web Applications*", IEEE 8th International Workshops on Enabling Technologies; Infrastructure for Collaborative Enterprises, Stanford, CA, USA; Jun. 16, 1999; pp. 158-163.

* cited by examiner

UNIFORM RESOURCE LOCATOR ACCESS MANAGEMENT AND CONTROL SYSTEM AND METHOD

CROSS REFERENCE TO RELATED APPLICATION

This application claims benefit of Provisional Application Ser. No. 60/310,519, filed on Aug. 6, 2001, entitled "URL Access Enforcement in DSAME," by inventors Shivaram Bhat, et al.

This is related to Shivaram Bhat, et al., co-filed U.S. patent application Ser. No. 10/128,415, filed on Apr. 22, 2002, titled "WEB-BASED APPLICATIONS SINGLE SIGN ON SYSTEM AND METHOD." To the extent not repeated, the contents of this patent application are herein incorporated by reference.

1. Field of the Invention

The present claimed invention relates generally to the field of Internet and enterprise server systems. More particularly, the present claimed invention relates to access requests in an enterprise server environment 2. Background Art The Internet has become the dominant vehicle for data communications with a vast collection of computing resources, interconnected as a network from sites around the world. And with the growth of Internet usage has come a corresponding growth in the usage of Internet devices, wireless devices and services in ways different from the traditional uses of such devices.

The growing base of Internet users has become accustomed to readily accessing Internet-based services, which traditionally were restricted or limited to the "client/server" environment, at any time from any location. Accessibility of traditional business services and products over the Internet means enterprises need to adjust to new paradigms of transacting business.

Consequently, some organizations are, for example, implementing a variety of web-based business resources and services. As businesses migrate to implementing numerous business applications on the Internet, and web-based applications become pervasive in the enterprise business environment, businesses must find ways to protect their valuable resources and services over the Internet.

To achieve this, some businesses implement several access authentication schemes in order to ascertain valid user access to protected resources in a corporate computer server. To access protected resources or services, users within a typical business enterprise environment must authenticate themselves to access web-based resources.

In this way, business organizations are making a transition from unsophisticated network infrastructure to an "intelligent" network infrastructure. Additionally, directory services are becoming an essential part of today's network-centric computing infrastructure. In making such a transition, efficient management of services and resources offered by such intelligent networks becomes critical. Today, managing organizations' mission critical applications for users and policies is a time-consuming individual configuration process that is unsuitable for enterprises and service providers seeking to create intelligent networks.

User management and policy based tools for managing services are becoming an important requisite for intelligent networks which must be capable of dynamically providing services. Furthermore, as businesses extend their intranet services to extranets to include suppliers, business partners, and customers providing access control increases in size and complexity. Organizations responding to the rapidly changing conditions of today's business environments, need to simplify and automate the configuration and control of access to their services.

Directory-enabled applications now power many important processes of an enterprise, including resource planning, value chain-management, security and firewalls, and resource provision. Directory services also play a key role in the deployment of e-business and extranet applications.

One of the drivers behind the widespread market adoption of directory services is the momentum of the open Lightweight Directory Access Protocol (LDAP) standard, which provides a common language for applications and servers regardless of the underlying operating environment. As organizations learn to move with more financial, organizational and competitive agility in the market place, decisions about directory services infrastructure have a direct effect on business processes and the bottom line.

On-line directories that support the LDAP have become critical components of e-business infrastructure, supporting identity and risk management in several important roles. They provide a dynamic and flexible means of storing information and retrieving it over the Internet LDAP directories can also be configured to use the Secure Sockets Layer (SSL) or Transport Layer Security (TLS) protocols for authenticated communications. As protected repositories of personal information, LDAP directories are also a key component for the personalized delivery of services to users of the directory and personalized treatment of information contained in the directory.

In general, an LDAP directory is a specialized database that is read or searched far more often than it is written to, with a flexible mechanism for ongoing changes in the types of information that can be stored.

Today, directories exist in a multitude of applications ranging from operating system management systems, PBX's badge security systems, and HR systems to email and database applications. The cost of implementing and administrating these disparate proprietary directories is great because each one must be managed independently which results in enormous administrative burdens and costs to already strained IT budgets. However, LDAP complaint systems leverage a single, master directory that owns all user access control information.

This directory server becomes the central repository for group and single access control information to all applications on the network. The business value of a unified directory is compelling. Unified directories eliminate redundancy which lowers management costs. In addition, unified directories ensure that applications can run within and outside of an organization so that partners, customers and vendors may participate in network applications where appropriate.

Furthermore, policy and management is a step in that direction. Policy and user management leverages the directory as central policy repositories that allows a variety of servers and applications to share a consistent set of policies and user databases.

Additionally, organizations need to implement user access authentication and authorization schemes to enable user access to protected corporate resources and services. There are several ways to which users' authentication and access policies can be entered.

Each application that a user may be trying to access may check whether the user is authenticated and, if authenticated, whether the user can access the requested resource. From a security perspective, the fact that a user can access an application even if the user is not authenticated or authorized may not be acceptable.

FIG. 1 is a block diagram illustration of a enterprise server environment The enterprise server environment depicted in FIG. 1 comprises a directory server 110, or the like, and applications 120-150. In the environment depicted in FIG. 1, a user can directly access each of applications 120-150. Access to each of applications 120-150 is subject to the user being authenticated by each individual application.

In the environment depicted in FIG. 1, for the user to access protected resources or services, the user must authenticate. If the user authenticates successfully and if the user is authorized to access the resources, the user is given access to the resource.

There are several ways in which the user's authentication and access policies can be enforced. Each application the user is trying to access may check whether the user is authenticated and if authenticated, whether the user can access the requested resource. From a security point of view, the fact that the user can access an application even if the user is not authenticated or authorized may not be acceptable.

Ideally, the user should not access an application or a resource if the user is not authenticated or authorized to use that resource or application. In order to prevent an authenticated or unauthorized access to web resources, there should be a way to verify user's credentials before the user's request is sent to the requested resource or is serviced by the web or directory server.

However, prior art systems of authentication do not provide a convenient way of authenticating and authorizing user access to protected network resources and applications. Also, the prior art does not also provide a convenient way of tracking user authentication and authorization without having to consistently interrupt the user for authenticated credentials for each application accessed.

As the number of business applications on the Internet increases, having an efficient and robust way of controlling user's access to directories and files over the Internet is a requirement to ensure an efficient use of Internet resources and applications within an organization.

SUMMARY OF INVENTION

Accordingly, to take advantage of the myriad of Internet based applications resources and services being developed, an Internet infrastructure system is needed that has extensibility capabilities to allow access authentication and authorization to web-based resources and services in a business enterprise environment. Further, a need exists for a system and method of tracking user access to network resources and application services in order to provide authentication and authorization to user access requests for users within the business environment. A need further exists for "out-of-the-box" solutions to allow technically unsophisticated end-users to connect to the Internet and access sophisticated web-based applications and resource requests without having to manually authenticate with each application or resource on each access. A need further exists for an improved and less costly device independent system, which improves efficiency and provides access to web-based content to various users of different configurations without losing the embedded features designed for these devices.

What is described in one embodiment is a uniform resource locator (URL) access configuration and control system having a Internet server supporting a robust authentication and authorization system. This system provides access to a list of URLs to Internet applications resources and services in a corporate directory server system. In one embodiment of the present invention, the URL access control system includes an authentication service system that authenticates user access requests. The user access request is typically directed to protected web-based software applications and services which may be specific to an organization or an entity.

In one embodiment of the present invention, the authentication service system includes a user agent policy system that sets user access policies for the protected applications in the directory server. The agent policy requisition and order management module helps organizations streamline the requisitions process in the organization.

The present invention further includes a session service that monitors a user's session after the user has been authenticated to access particular files or directories in the enterprise server. The session service enables the present invention to bypass user re-authentication after the user has been initially authenticated and validated.

Embodiments of the present invention are directed to a system and a method for accepting user access requests to pre-defined files and applications specific to the particular user and authenticating the user's request to these applications. In general, embodiments of the present invention vary the degree of authenticating a user and granting a user access to URL files and directories over the Internet to an organization's web-based applications and resources.

Embodiments of the present invention include a Uniform Resource Locator access module that is implemented as part of a server module in an enterprise server environment The URL access module contains a list of URLs that a user can access upon authentication and authorization by the server. The lists may include an allow access list which includes a list of URLs that a user may access. The list may further include a deny access list that contains a list of URLs that a user may not access in the server. Additionally, the URL list includes a list of not enforced URLs that define the URLs that are not subject to an access policy enforcement of the server.

Embodiments of the present invention also include an authentication service module. The authentication service module provides processes for the user to authenticate to the server. In the present invention, the user may authenticate to the server by several methods that may include user authentication credentials such as user name, user password, user organization, etc.

Embodiments of the present invention further include a profile service module that is used to retrieve and track the user profile of a user access to URLs in the server. Embodiments of the present invention also include a URL access service that uses an extensible markup language (XML) over a hypertext transport protocol (HTTP) interface of the authentication service and profile services, respectively, to validate a user's request. The URL access service validates a user's credentials to enforce the user's URL access policy to protected resources and applications in the web-based applications and resources.

To achieve the URL access control of the present invention, embodiments also provide a software implemented process based on URL access service using the server's XML interface to validate user requests to a particular URL. In one embodiment of the present invention, each user request to a server is intercepted by the URL access service to determine whether to grant access to a required URL or not. Embodiments of the present invention may include cookie technology as part of the request URLs. The URL request is presented to a session service in the server to validate the user's credentials. If the user's credentials are valid, the request proceeds further to the URL access enforcement logic to be processed.

Embodiments of the present invention further include URL enforcement logic. The URL enforcement logic provides the server with the ability to process valid URL user requests. If a user's request has valid user credentials, the request proceeds further for URL access enforcement after the user has been authenticated. If the credentials are not valid, the user is requested to authenticate to the server.

Embodiments of the present invention further include logic to authenticate and authorize users access to a URL. This is achieved by sending a URL request to the profile service to retrieve a user's URL access policy that is subsequently used to determine which URL list the user may access.

Embodiments of the present invention include caching logic of the URL access service for caching the user's credentials and the user's URL access policy. The present invention updates the cache when credentials change or become invalid or when the access policy changes. Embodiments of the present invention also include fail-over logic. The fail-over logic enables the URL policy enforcement service to configure a secondary server independent of the primary server when the primary server fails in order to ensure the continuity of a user's access to the particular URL list. Additionally, embodiments of the present invention, may comprise a list of fail-over servers the URL policy service will use upon failure of one or more of the servers.

Embodiments of the invention also include a token identification system and method that uniquely identifies an authenticated user to specific applications within the applications environment. The token identification mechanism sets a unique identifier for each URL user request after the user's request to particular applications in the directory server is authenticated and validated. The unique identifier allows the present invention to track the user's session activities within specific applications. These applications have pre-defined rights and privileges that may be set to determine which users, entities, and sub-applications may have access to a particular application.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrates embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Embodiments of the present invention are directed to a system, an architecture, subsystem and method to manage and control access to a uniform resource locator (URL) resources and applications in a network environment in a way superior to the prior art. In accordance with an aspect of the invention, a URL enforcement system in an enterprise server system provides user access to resources and applications stored in a server connected to the Internet. In the present invention, an enterprise server system may include a directory server, an Internet web server, or the like.

In the following detailed description of the present invention, a system and method for Internet protocol based resource and applications access control system are described. Numerous specific details are not set forth in order to provide a thorough understanding of the present invention. However, it will be recognized by one skilled in the art that the present invention may be practiced without these specific details or with equivalents thereof.

Generally, an aspect of the invention encompasses providing a uniform resource locator access enforcement system which provides access to a wide range of applications and other services to online users who may connect to an enterprise server system.

Figure 1:
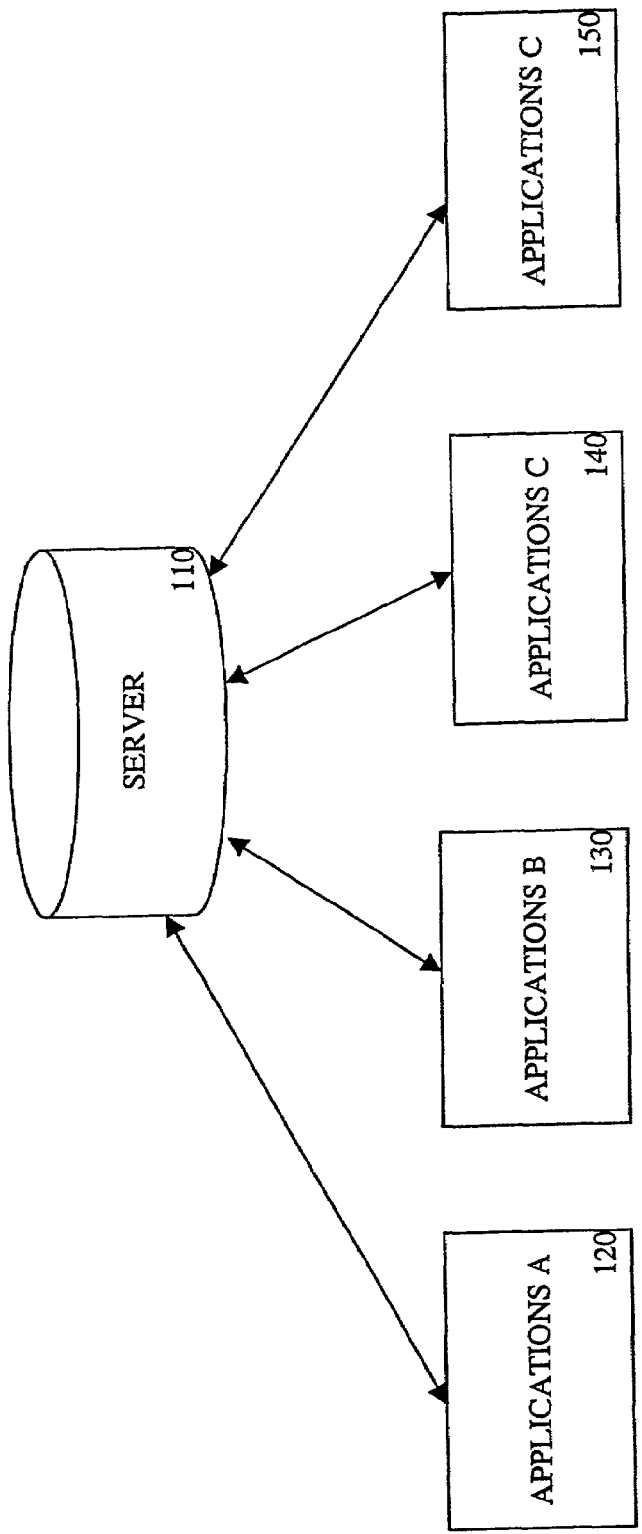
FIG. 1 is a block diagram of the Internet infrastructure environment of the prior art.
Figure 2:
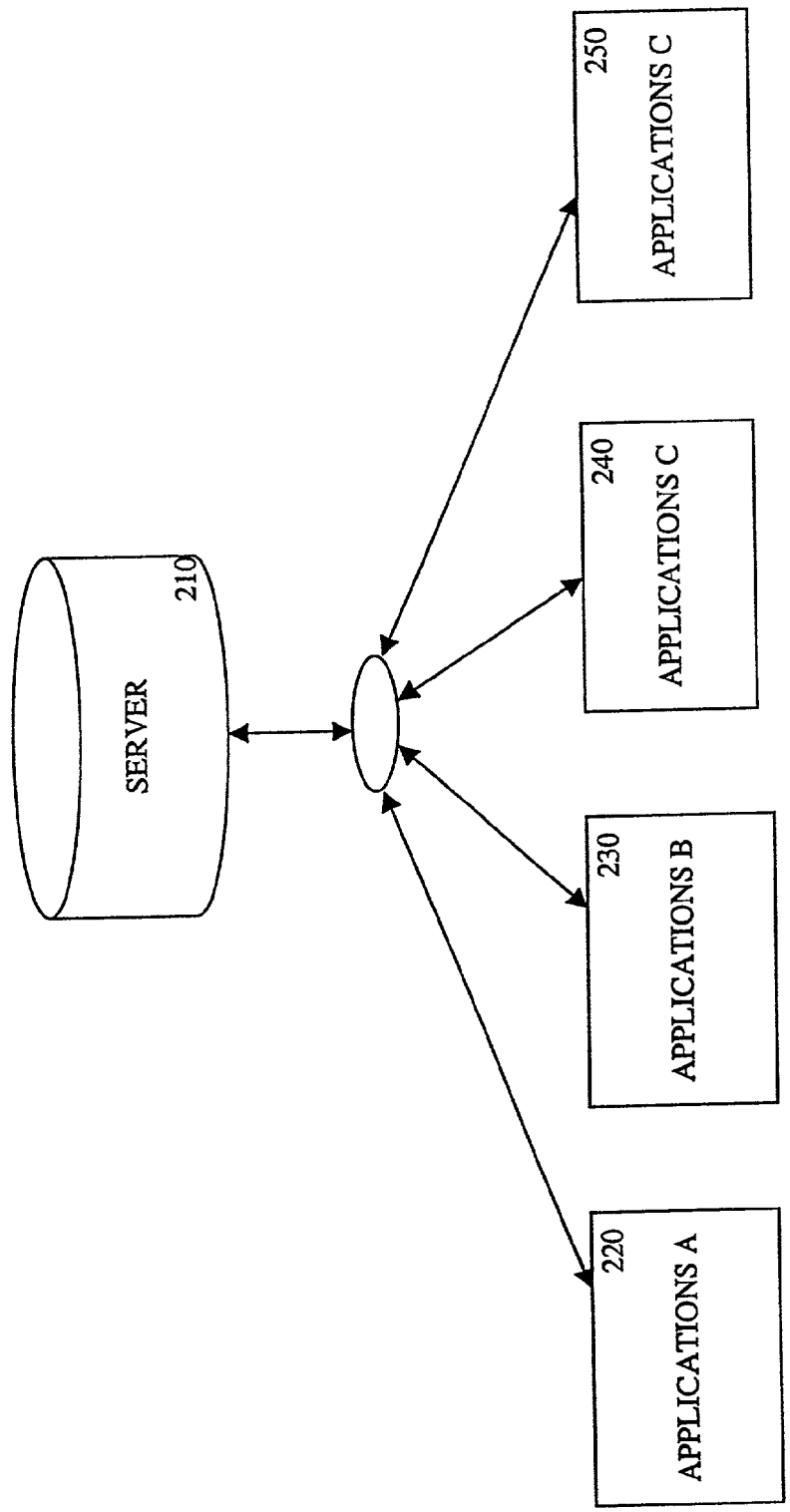
FIG. 2 is a block diagram of one embodiment of the Internet infrastructure of the present invention.

FIG. 2 is a block diagram illustration of an enterprise server system environment The enterprise server system environment depicted in FIG. 2 comprises a server 210 and applications 220-250. In the environment depicted in FIG. 2, a user can directly access each of applications 220-250. Access to URLs in each of applications 220-250 is subject to the user being authenticated by each individual application.

In the environment depicted in FIG. 2, for the user to access protected resources or services, the user must authenticate. If the user authenticates successfully and if the user is authorized to access the resources, the user is given access to the resource. In the environment shown in FIG. 2, a user's URL request to applications 220-250 is centrally handled by a URL access service of the present invention in server 210.

Figure 3:
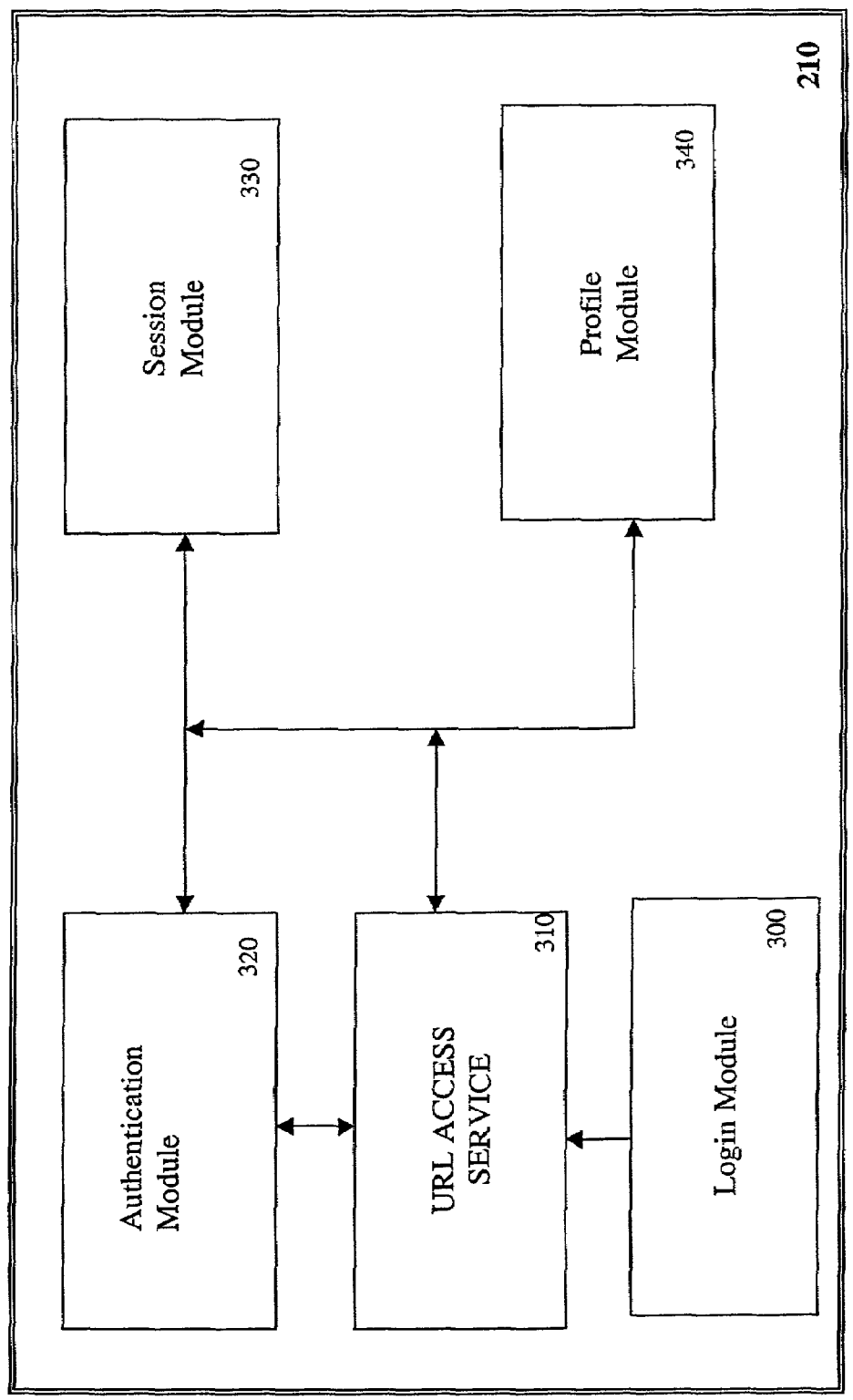
FIG. 3 is a block diagram of one embodiment of the enterprise server system of the present invention.

FIG. 3 is a block diagram depiction of one embodiment of the server system of the present invention. The server system shown in FIG. 3 may be a directory server, an Internet webserver, or the like. In the exemplary directory shown in FIG. 3, server 210 comprises login module 300, URL access service module 310, authentication module 320, session module 330 and profile module 340.

The URL access service module 310 provides the Uniform Resource Locator access control and management of the present invention. The URL access service module 310 provides the server 210 (FIG. 2) with the logic and option to protect Internet software applications and services from unauthorized authenticated users of these applications.

The URL access service module 310 of FIG. 3 further provides the server 210 with the access implementation logic to selectively allow access to specified applications (URL) and services within enterprise organizations. By selectively allowing only authorized and authenticated users access to particular files within an organization's file database, the URL access service module 310 ensures that corporate enterprise resources are efficiently and effectively utilized.

Further, the authentication module 320 along with URL access service module 310 and session module 330 provide authenticated users of the server 210 with continuous and uninterrupted use of resources and applications available on the server without having to authenticate into each application the user attempts to access.

The login module 300 provides login services to the server 210. Login module 300 includes logic to provide a single-sign-on (SSO) login services to users attempting to access software applications and services on directory server 210. The function of the single-sign-on services of the authentication module 320 is described in further detail in the co-pending U.S. patent application entitled "WEB-BASED APPLICATIONS SINGLE SIGN ON ACCESS SYSTEM AND METHOD", filed Apr. 12, 2002, Ser. No. 10/128,415, which is hereby incorporated by reference herein.

Still referring to FIG. 3, URL access service module 310 controls user access to URLs in the server 210. The URL access service module 310 includes logic that determines which URLs a user may or may not access. The URL access service 310 further includes a list of URLs that specifies which URLs may be retrieved in response to a user's URL access request.

Each user request to the server 210 is intercepted by the URL access service 310 using the mechanism provided by the server 210 serving the URL resource. If there is no user credentials in the user's request, URL access service 310 automatically forces the user to authenticate with authentication module 320 at that time. If the user request has user's credentials, for example, in the form of a cookie or as part of the URL request, the request is presented to the session module 330 to validate the user's credentials. If the user's credentials are valid, the request proceeds further for URL access enforcement. If the credentials are invalid, the user is requested to re-authenticate.

The session module 330 provides session tracking mechanism to enable the authentication logic of the present invention to track a user's login session to the server 210. The URL access service module 310 uses the session module 330 to automatically authenticate the user's access to subsequent applications, after the initial login without having to manually re-login.

The profile module 340 provides user profile information to the authentication module 320. The profile module 340 provides an XML over http(s) interface for obtaining user, service and policy information. A user's profile information typically includes the user-name, the user's password, the user's entity within a particular organization.

The profile information further defines the user's application access rights which determines or sets forth user's rights to files and directory within applications and resources in the server 210. The profile module 340 is ideally suitable for policy enforcement agents.

Figure 4:
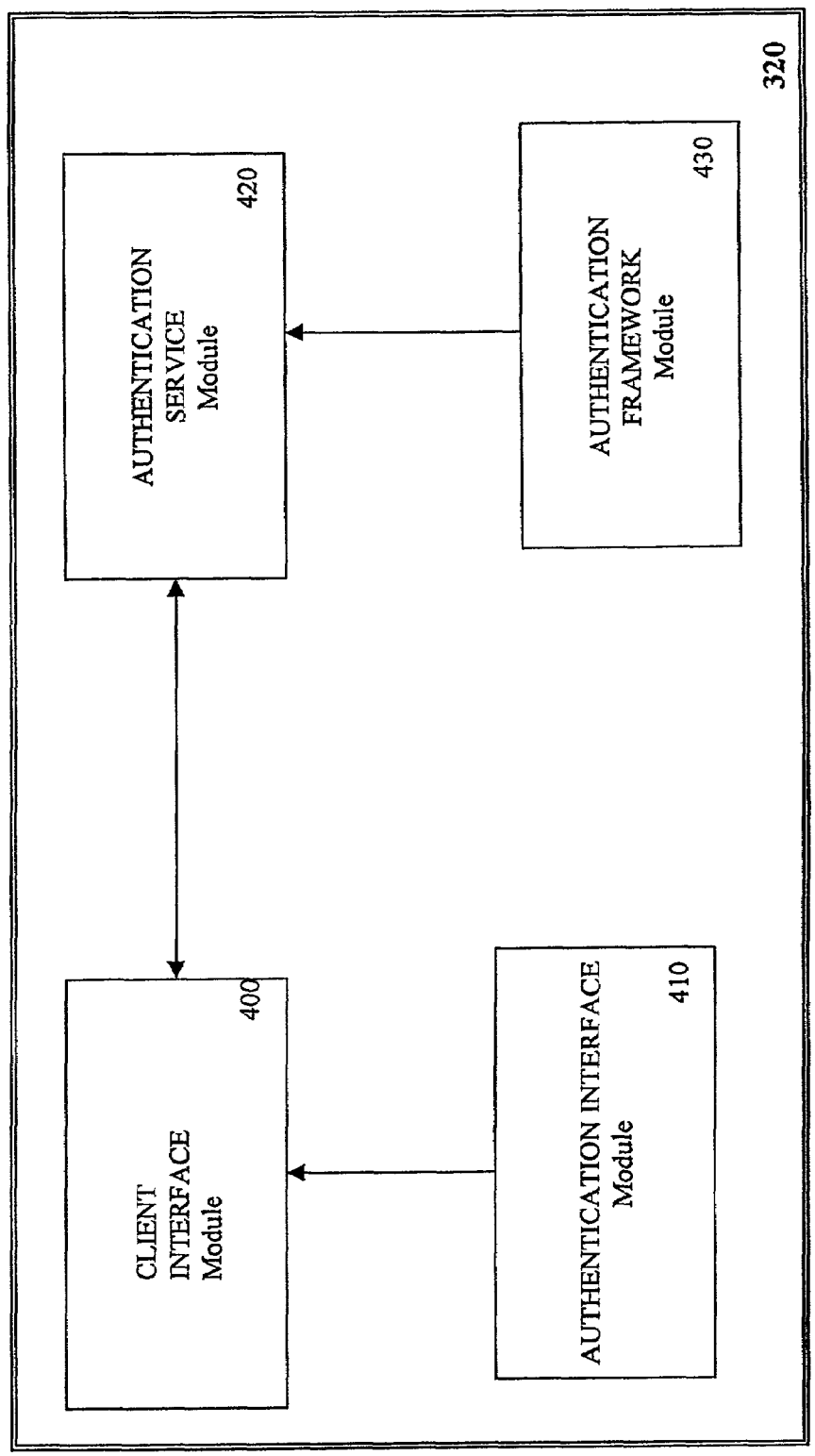
FIG. 4 is a block diagram of an embodiment of the architecture of the applications and resource access authentication system of the present invention.

FIG. 4 is a block diagram illustration of an internal architecture of one embodiment of the authentication module 320 of the present invention. As shown in FIG. 4, the authentication module 320 comprise client interface module 400, authentication interface module 410, authentication service module 420 and authentication framework module 430.

The client interface module 400 provides a plurality of client interfaces. The first of these is an interface to the authentication service 320 to provide an HTML interface, and the other is in the form of a Java interface that provides Java interfaces. Although there are two client interfaces, both use the same underlying authentication framework and authentication modules.

The authentication services module 420 is provided as a service within a servlet container using Java Servlet in one embodiment. Thus, the authentication service module 420 can be deployed in a web server and an applications server that support a servlet container. The client interface module 400 provided by the authentication service module 420 is HTML over HTTP(s), which makes it convenient to use with a web browser. Since most Internet service providers provide Internet solutions via a web browser, using the client interface 400 provides a user with one means of utilizing the teachings of the present invention.

In a typical implementation of the present invention, the authentication service module 420 (which is implemented as a URL) is a login page for an organization or a service, or users are re-directed to the authentication service URL when users access a resource that is protected. The authentication service module 420 guides the user through a series of one or more screens for credentials gathering (like user name, password, employee number, etc.), based on the requirements of the authentication modules that are configured.

For simple authentication modules like LDAP and Unix, the required credentials may be user name and password and may be obtained in one screen. However, for complicated challenged-response type authentication algorithms, more login screens would be required.

Once the user has provided the required credentials, the authentication service module 420 relies on the authentication framework module 430 to determine if the user has been successfully authenticated. If the authentication is successful, the user is re-directed to an organizations or a service home page (URL) if the user is authorized access to that particular URL. If the authentication process fails, the user is re-directed to an error page (URL). Both of the re-direction of URLs are configurable by the system administrator.

Once a user has been authenticated successfully, the user is issued an encrypted login token identity using the cookie or URL-rewriting mechanism provided by HTTP in one embodiment. The login token is used to access different applications without having to re-authenticate.

The authentication framework module 430 couples the client interface module 400 to the authentication service module 420. The authentication framework module 430 provides the configuration of authentication modules in the authentication service module 420 based on an organization or a user. The authentication framework module 430 further provides a mechanism to chain a variety of pluggable authentication modules in authentication service module 420.

Figure 5:
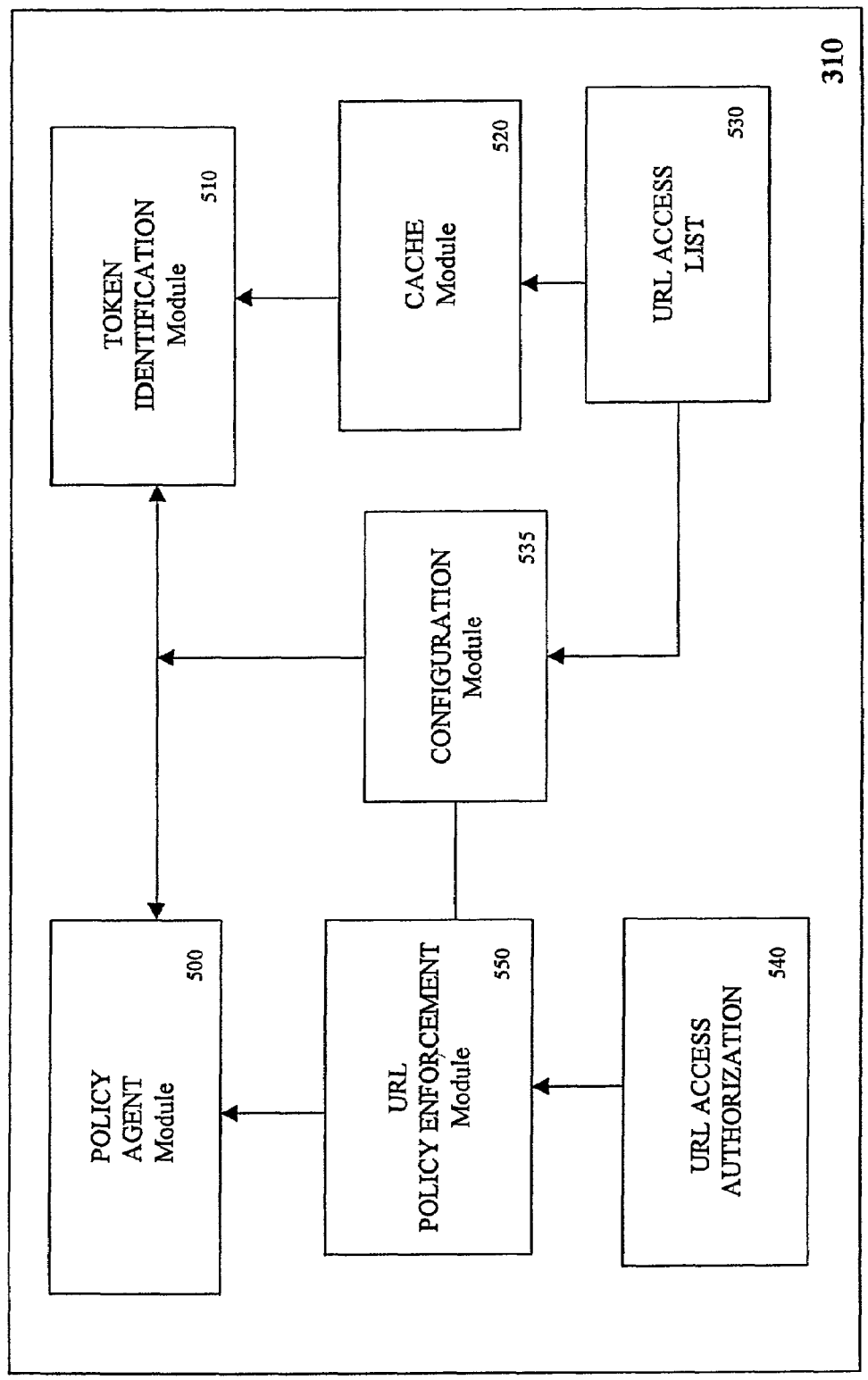
FIG. 5 is a block diagram of one embodiment of the URL access service module of FIG. 3.

FIG. 5 is block diagram depiction of one embodiment of the URL access service 310 of the present invention. As shown in FIG. 5, the URL access service 310 comprise policy agent 500, Token identification (Token-id) 510, Cache 520, URL access list 530, configuration module 535, URL access authorization 540 and URL policy enforcement 550.

The policy agent 500 provides the URL access service 310 with a way to prevent unauthenticated and unauthorized access to web resources. The policy agent 500 further provides a way to verify user credentials before user requests are presented to a requested resource or service. The policy agent 500 includes custom functions that are executed to verify user credential via URLs. The policy agent 500 intercepts each user request received by the server 210. Primarily, the policy agent 500 performs two functions: validate a user's sign-on and enforce a user's URL policy.

User access to web resources and services are only granted after the policy agent 500 has completed verification of the user credentials. The policy agent 500 includes controls which can intercept every request the server 210 receives before the requested is serviced by the server 210. In one embodiment of the present invention, policy agent 500 includes one or more pluggable policy agent modules.

Token-id 510 of FIG. 5 is coupled to provide a set of user specific unique identifiers that are contained in each user request to the server 210. Token-id 510 is unique for a user on a given server and it enables the policy agent 500 to use the unique identifiers to set the authentication parameters of each user request.

The Token-id 510 also includes information that indicates whether a user's request is subject to URL policy enforcement or not. In the present invention, once the user is authenticated to the server 210, each user's request to the server 210 contains a user identification token. This token is set by the server 210 once the user successfully authenticates. The token is unique for a user on any given server.

Once the policy agent 500 intercepts a request, it looks for the token. The policy agent 500 then uses the server 210 service to verify if the token represents an authenticated user. If the user is authenticated, the request is subjected to the user's URL policy enforcement. If there is no user identification token in the user's request, the user is redirected to the authentication page.

Cache module 520 is utilized by the URL access service 310 to store both a user's credentials and a user's URL access policy. The Cache 520 is updated when the user's credentials change or become invalid or when the access policy changes. To update the Cache 520, the URL access service 310 registers with Session module 330 for update notifications from the server 210. When a user's credentials become invalid, the session service 330 sends a notification to the URL access service 310 to update the Cache 520.

Similarly, the URL access service 310 registers with the profile module 340 to receive URL policy change notifications. When the user's URL policy changes, the URL access service 310 receives a notification to update the Cache 520 for that particular user.

The configuration module 535 allows the URL access service logic 310 to be configured to log all URL accesses, only URL allow accesses, only URL deny accesses and only URL not enforced accesses respectively or a combination of these. The log files can be used to gather statistics about page visits per user, total number of page visits by all users, all page visits, etc. The URL logging can also be configured to find each user's total authenticated time during that session. The configuration module can also be configured to allow a set of URLs that are allowed for all users of the server 210 irrespective of the organization, role of the user and irrespective of the user's URL policy.

The URL access authorization module 540 provides the URL access service 310 the logic to authorize access to a particular URL after a user's credentials are validated. When the URL access authorization module 540 receives a user request, the URL access service 310 sends the request to the profile module 340 to retrieve the user's URL access policy. The response from the profile module 340 is compared with the user's request contents to determine the set of access rights the user may have via the URL policy enforcement logic 550.

Still referring to FIG. 5, policy enforcement module 550 is coupled to implement URL access policies in the authentication service module of the present invention. Once a user's identification is verified, the policy agent 500 checks if the user is allowed to access the resource that is in the form of a URL.

Each user is given certain URL access policy. The user's URL policy contains three attribute value pairs which are stored in URL access list 530. These attributes are inherited by the policy agents 500. These attributes can be application specific, organization specific and modifiable for an entity in an organization's hierarchy.

The attributes that may be specified by the policy agent 500 may include an "access allow" list, an "access deny" list and an "access not enforced" list The access allow list is a list of all the URLs that an authenticated user is allowed to access. The access deny list is the list of all URLs that an authenticated user is not allowed to access. And the access not enforced list is the list of all URLs that are not subjected to URL policy enforcement. However, the user still requires authentication in order to access this list.

While enforcing the URL access policy, deny privileges takes precedence over allow privileges. An empty deny list will allow only those resources that are allowed by the allow list. An empty allow list will not allow access to any resources except those in the not enforced list. By default, the policy enforcement module 550 may implement a wildcard entry mechanism which allows access to all the application resources and services residing on server 210.

For example, the AccessAllowList may contain the following value: http://www.companyname.com/*./directroyserverServices/*/AccessAll, the deny list may also contain a similar wild card value such as: http://www.companyname-.com/internal/*./HiddenServices/*/DenyAll, and the not enforced list may contain the wild card value of: http://www.companyname/logn,/logouy,/images/*

However, since the deny list takes precedence over the allow list, anything in the deny list will not be allowed to be accessed even if the allow list contains the wild card entry. If the URL policy cannot be resolved between the deny list and allow list, the access will not be allowed to that resource.

The URL policy enforcement 550 also provides fail over capabilities to the URL access service logic 310. For example, if the URL access service logic 310 is accessing a particular first server for enforcing user authentication and URL access policy and that particular server happens to become inoperative, the server can be configured to go over to a fail-over second server that may be independent of the first server to complete the URL access. The data between the two servers is the same in order to give similar results to the URL access service 310. Having the fail-over capabilities ensures that the URL access service is always available.

Figure 6:
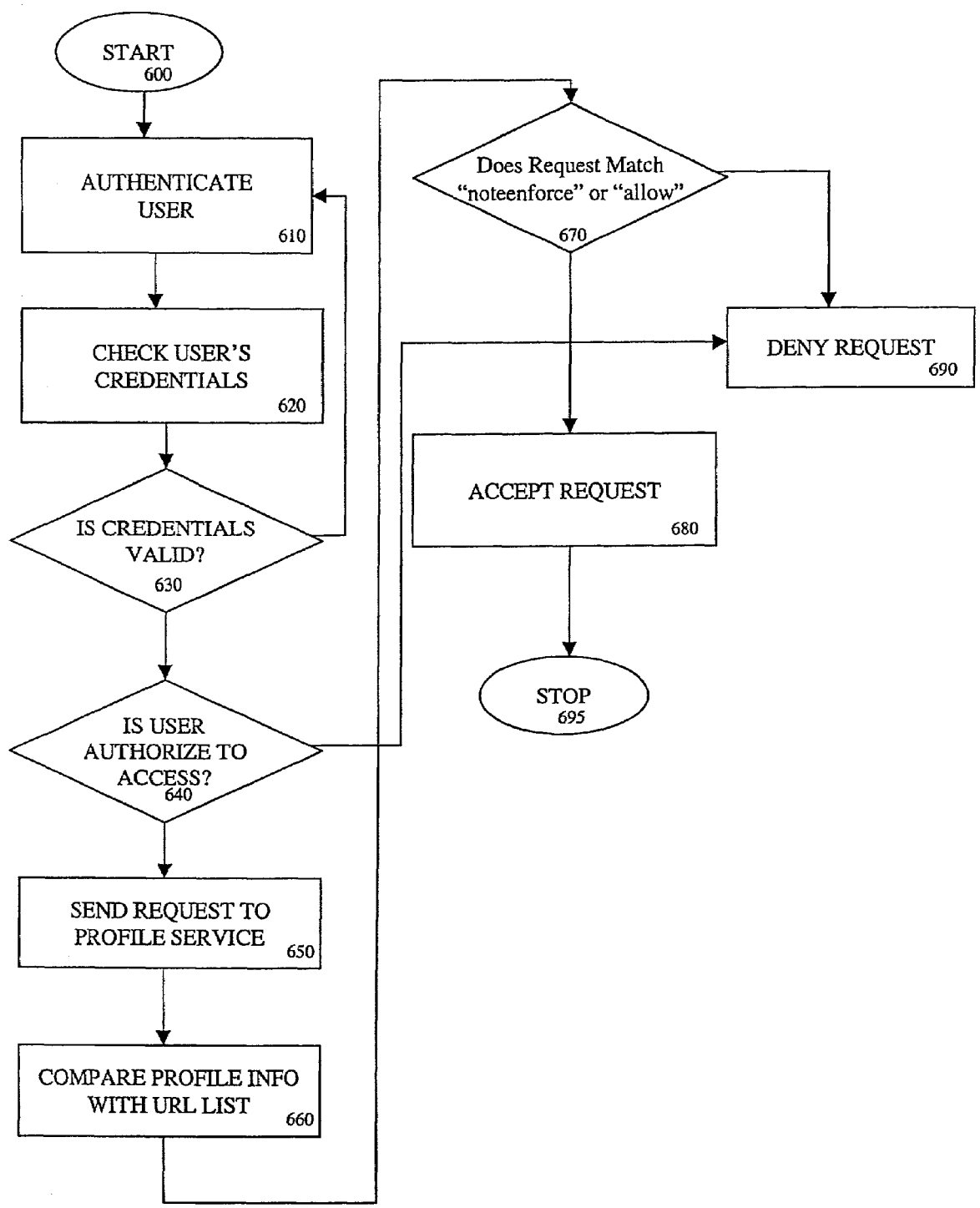
FIG. 6 is a block diagram of an exemplary process flow implementation of a uniform resource locator access control processes of an embodiment of the present invention.

FIG. 6 represents a flow diagram depiction of an exemplary process flow in accordance with one embodiment of the URL access processing of the present invention. The steps performed by the diagram of FIG. 6 is performed by a computer system processor executing memory stored instructions which make up a program or an application.

As shown in FIG. 6, the processing of a user's URL access request is initiated at step 600 when a user's URL request is presented to the URL access service 310. At step 610, the user is authenticated via the authentication service 330. Upon authenticating, the user's request is intercepted by the URL access service 310 at step 620 to check the credentials of the user.

At step 630, if the user's request does not include any credentials, the URL access service 310 forces the user to authenticate at step 610. Further, if the user's credentials are invalid, the URL access service 310 forces the user to again authenticate at step 610. Also, if the user's request has credentials in the form of a cookie or is part of the request URL, a request is sent to the session service 330 to validate the user's credentials.

If the user's credentials are valid, processing proceeds to step 640 where the URL request proceeds further for URL access enforcement. And the URL access service 310 determines whether the user is authorized to access the URL request.

At step 650, the URL access service 310 sends the URL request to the profile service 340 when it determines that the user's credentials are valid and the user is authorized to access the URL list. The profile service retrieves a corresponding URL access policy to match the user's request.

At step 660, the user's URL request is compared with the contents of the URL list to determine which list the user can access. At step 670, after comparing the contents of the URL list with the user's URL request, the URL access service 310 determines whether the user's request matches the "not enforced access list" or the "access allow list" respectively. If the user's URL request matches either of the two lists, the user's request is processed at step 680.

If, on the other hand, the user's URL request does not match either the access allow list or the access not enforced list, the user's URL request is denied and processing terminates at step 695.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A uniform resource locator (URL) access enforcement system comprising:
a server having a centrally controlled URL access enforcement system;
a plurality of web-based applications that are accessed via said centrally controlled URL access enforcement system; and
a single sign-on access system coupled to said server for providing single sign-on access authentication and authorization to said plurality of web-based applications for a user,
wherein said server comprises a URL access control logic for controlling user access requests to URLs in said server comprising an identification token for uniquely identifying each authenticated user that successfully connects to said server,
wherein said URL access control logic further comprises a URL access list comprising a list of URLs that an authenticated user connected to said server accesses, wherein the URL access list comprises an access allow list that comprises a respective list of URLs that each authenticated user is permitted to access, and an access deny list that contains a respective list of URLs that each authenticated user is not permitted to access, wherein said access deny list takes precedence over said access allow list, and wherein a user URL request is compared to said access allow list and said access deny list to determine which URLs an authenticated user is permitted to access,
wherein said identification token comprises information indicating whether a user request is subject to URL policy enforcement, and
wherein said single sign-on system comprises token listening logic configured to notify each of said plurality web-based applications when said identification token that is assigned to said user expires.

2. The URL access enforcement system of claim 1, further comprising a login logic for providing a login interface for providing user connection to said user.

3. The URL access enforcement system of claim 1, wherein said URL access control logic comprises a policy agent logic for executing a set of authentication functions in said server to verify authentication credentials of a user attempting to connect to said server.

4. The URL access enforcement system of claim 1, further comprising a URL policy enforcement logic for enforcing URL access policies of each authenticated user connecting to said server to access a list of URL files and directories.

5. The URL access enforcement system of claim 4, wherein said URL access policy is unique to each authenticated user connecting to said server.

6. An enterprise server system, comprising:
authentication service logic for providing single sign-on access authentication and authorization to said server system for a user;
session service logic for tracking and monitoring a user access session to directories and files in said server system;
profile logic for storing a user profile defining each user's access to said directories and said files in said server system;
uniform resource locator (URL) access control logic for controlling user access requests to URLs in said server system, wherein said URL access control logic comprises an identification token for uniquely identifying each authenticated user that successfully connects to said server system, wherein said identification token comprises information indicating whether a user request is subject to URL policy enforcement, wherein said URL access control logic further comprises a URL access list comprising a list of URLs that an authenticated user connected to said server accesses, wherein the URL access list comprises an access allow list that comprises a respective list of URLs that each authenticated user is permitted to access, and an access deny list that contains a respective list of URLs that each authenticated user is not permitted to access, wherein said access deny list takes precedence over said access allow list, and wherein a user URL request is compared to said access allow list and said access deny list to determine which URLs an authenticated user is permitted to access;

login logic for providing a login interface between each user and said server system; and listening logic configured to notify said server system when said identification token that is assigned to said user expires.

7. The server system of claim 6, wherein said authentication service logic comprises an authentication framework module for configuring a plurality of authentication modules based on characteristics of an organization.

8. The server system of claim 7, wherein said authentication service logic further comprises authentication interfaces substantially based on said hypertext transport protocol (HTTP).

9. The server system of claim 6, wherein said URL access control logic comprises a policy agent logic for executing a set of authentication functions in said server system to verify authentication credentials of each user attempting to connect to said server system.

10. The server system of claim 6, wherein said URL access control logic further comprises a URL policy enforcement logic for enforcing URL access policies of each authenticated user connecting to said server system to access.

11. The server system of claim 10, wherein said URL access policy is unique to each authenticated user connecting to said server system.

12. The server system of claim 6, wherein said URL access list also comprises an access not enforced list that contains a respective list of URLs not subject to said URL enforcement policy of said URL access control logic, but which each authenticated user is permitted to access.

13. The server system of claim 10, wherein said URL access control logic further comprises a cache for storing updated user credentials and URL access policy information.

14. The server system of claim 6, wherein contents of said URL access list is modifiable for each entity using said server system within a business enterprise.

15. The server system of claim 12, wherein access to said access not enforced list requires said user profile and authentication characteristics.

16. A method for enforcing uniform resource locator (URL) files and directories in a server environment, said method comprising:

authenticating a user URL request transmitted to said server from a user, wherein said server comprises a URL access control logic for controlling user access requests to URLs, wherein said URL access control logic further comprises a URL access list comprising a list of URLs that an authenticated user connected to said server accesses, wherein said URL access list comprises an access allow list comprising a respective list of URLs that each authenticated user is permitted to access, and an access deny list containing a respective list of URLs that each authenticated user is not permitted to access, wherein said access deny list takes precedence over said access allow list;

establishing a session for said user URL request to identify said user across different requests to said server;

providing an identification token to uniquely identify said user URL request as part of a single sign-on access, wherein said identification token comprises information indicating that a user request is subject to a URL enforcement policy; and retrieving said URL enforcement policy that matches said user URL request;

determining which URL files and directories said user URL request can access using said URL enforcement policy, wherein determining which URL files and directories said user URL request accesses comprises comparing said user URL request to said URL access allow list and said URL access deny list;

providing single sign-on access authentication and authorization to said URL files and directories for said user; and notifying said URL files and directories when said identification token that is assigned to said user expires using token listening logic.

17. The method of claim 16, wherein said providing a URL enforcement policy comprises intercepting user credentials in said user URL request to validate said credentials.

18. The method of claim 17, wherein said intercepting said user credentials comprises checking valid user credentials to determine whether said user request has authorization to access a list of URLs in said server.

* * * * *